United States Patent Office 2,693,881
Patented Nov. 9, 1954

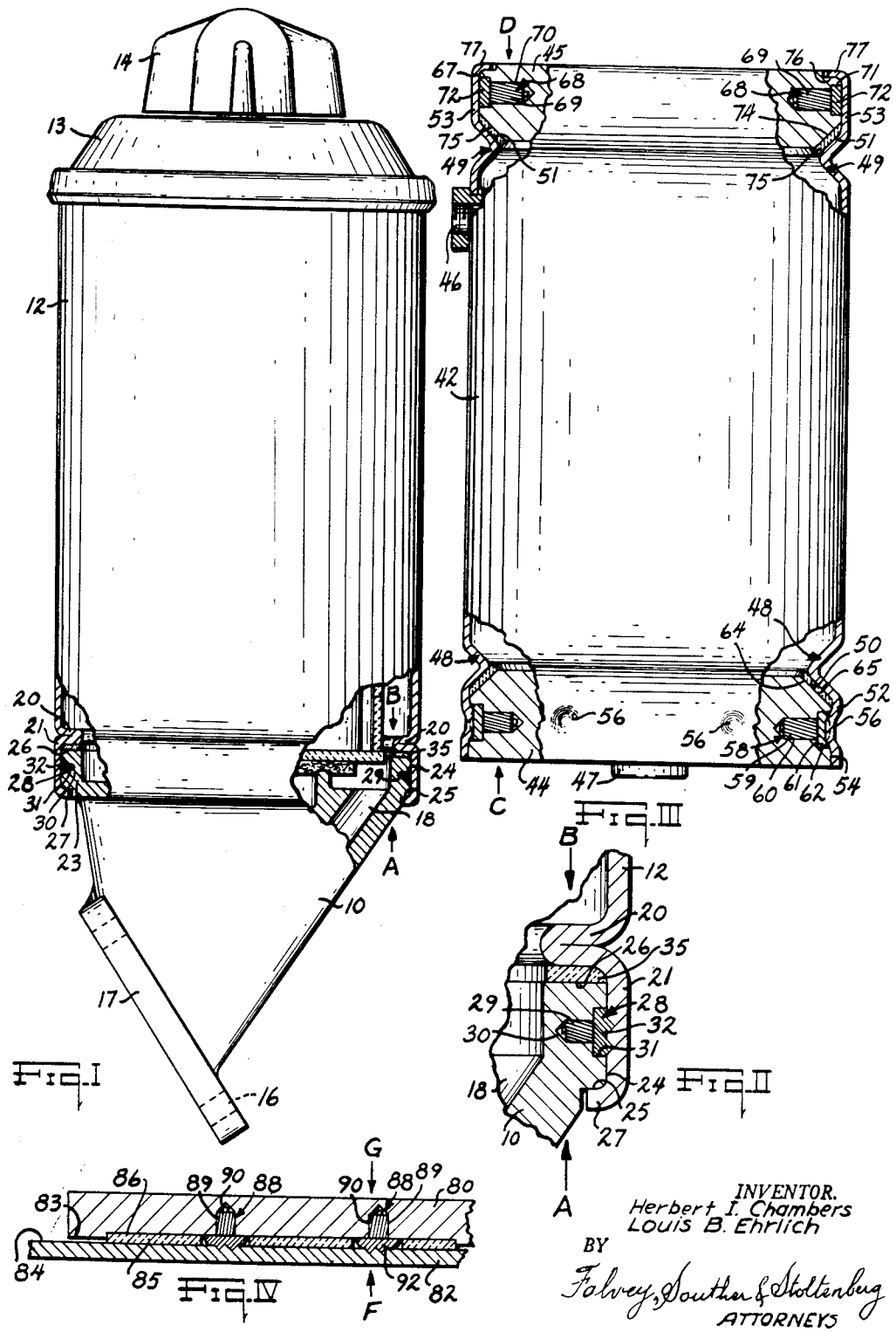

2,693,881

FILTER HOUSING AND METHOD

Herbert I. Chambers and Louis B. Ehrlich, Toledo, Ohio, assignors to The Electric Auto-Lite Company, Toledo, Ohio, a corporation of Ohio Application January 11, 1951, Serial No. 205,530

14 Claims. (Cl. 210—178)

The invention relates to filter housings and particularly to a composite structure including parts formed of materials of diverse physical properties joined together and sealed to produce a fluid-tight container particularly adaptable for enclosing filtering elements or retaining fluids under pressure.

The invention contemplates the means and a method of connecting together, by a novel joint, members which are not adapted to be welded due to their dissimilar physical properties.

The invention embraces the manufacture of a leakproof structure by joining component elements which are metallurgically dissimilar, or which have diverse adaptability to electric welding.

The invention comprehends the provision of means and method for effectively utilizing pressure welding for producing a perfectly tight and effective union in a simple and inexpensive manner between the parts composed of metals having dissimilar characteristics.

The invention includes the fabrication of a composite container adapted to retain fluids under pressure formed by a lightweight tubular member spot-welded to a cast iron base through welding inserts effecting the compression of a temperature-proof sealing gasket without relaxation for providing an effective seal therebetween, preventing leakage of fluid regardless of shocks and vibration and other severe conditions of use to which the container may be subjected.

The invention comprises a composite filter housing for cantilever mounting on the side of an internal combustion engine of simple construction and low production cost, the housing being not only of extremely lightweight but capable of withstanding, without impairment, large internal and external stresses as well as severe shocks and vibration without oil leakage.

The invention embraces the utilization of the change in the dimensions of one member with respect to another effected by thermal changes to enhance the compression imposed upon a heat-resistant gasket during the non-continuous welding of two members, producing thereby a permanent, leak-proof joint therebetween, resistant to the combined action of extreme temperatures and vibrations found in use.

According to the foregoing summary of the invention indicating its general nature and substance, one of its objects is the provision of means for joining or bonding electrically parts composed of metals which do not have the same physical or metallurgical characteristics for producing a fluid-tight, temperature-resistant and vibration-proof composite filter housing.

Another object of the invention is to provide an improved method whereby parts composed of metals lacking in welding affinity are readily and permanently held together by an electric current producing a hermetically sealed joint.

Another object of the invention resides in placing under compression a non-inflammable or heat-resistant gasket located between two members while raising the temperature of one member by the passage of electric current and thereby utilizing the contraction of the heated member as it cools to permanently retain the gasket enhancing the compression imposed thereon.

Another object of the invention is the provision of novel method and means for the production of a composite filter housing by effecting a fluid-tight joint between a thin tubular and a cast base member of diverse physical properties by electric welding using a high temperature-resistant gasket placed under compression concurrent with the application of the electric current, utilizing thereby the contraction of the thin tubular member which takes place after the current has been interrupted to effectively retain under compression said gasket.

A further object of the invention resides in the fabrication of a filter housing by the utilization of the heat generated during the welding operation to produce a substantially permanent hermetically-sealed joint between members which have diverse adaptability to electric welding.

A further object of the invention is the provision of a composite filter housing wherein the heat generated during the welding operation of the container part to its supporting member is utilized to provide a resultant force on a sealing gasket which will not relax under the combined action of extreme temperatures and vibrations producing a hermetically sealed joint which will not fail under the most severe service conditions.

A further object of the invention resides in the fabrication of a composite filter housing made from a length of standard metal tubing bonded to an end closing structure of a material dissimilar to the tube and wherein the tube is of very thin cross-section as its thickness is limited only by the hydraulic pressure used within the housing.

A further object of the invention resides in the provision of an improved joint between parts of dissimilar materials bonded by applying an electric current and subjecting the members to clamping force during the passage of electric current and the resulting cooling thereafter, so that grain growth of the metals at the joint is avoided and the relaxing of the metals after the force has been discontinued does not take place.

A further object of the invention resides in a composite filter housing for cantilever mounting on the side of an automotive engine made from tubing joined to a cast support by heating and compressing the tubing and clamping a high temperature resistant gasket, thereby utilizing the contraction of the tubing as it cools to enhance the force imposed on the gasket.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is an elevational view with parts broken away to show the invention as embodied in an oil filter adapted to be attached to a block of an automotive engine;

Fig. II is an enlarged fragmentary section of a portion of the filter housing;

Fig. III is a view similar to Fig. I showing other forms of the invention;

Fig. IV is a sectional view illustrating another embodiment of the invention.

The accompanying drawings show in detail certain illustrative embodiments of the invention, these being indicative of a few of the various way in which the principles and method of the invention can be carried out in practice. In the drawings, the invention is shown as embodied in a filter suitable for use in the lubricating system of engines of self-propelled vehicles. However, it is, therefore, expressly understood that the invention is not limited to the particular forms shown but other mechanical expressions are contemplated and the invention may be used whenever the same may be found to have utility.

Referring to the drawings, attention is directed to Figs. I and II which illustrate the invention embodied in a composite filter housing adapted for cantilever mounting on the side of an internal combustion engine for connection with the lubricating system thereof. The composite filter housing comprises an engine attaching or base member 10, a shell or container part 12 having a fluid-tight, temperature and vibration-proof connection therewith, and a detachable cover 13 held in fluid-tight relation at the top of the shell by a tensioning member 14. In accordance with the teachings of the invention it is contemplated that the base or support 10 and the shell or container member 12 joined thereto be made of the most effective materials for their respective use in order to obtain a composite filter housing of optimum quality at minimum cost. Thus, the base 10 and shell 12 may be made of materials having different physical properties or which have diverse adaptability to welding as well as of metals which are dissimilar in metallurgical characteristics or lacking in affinity to electric welding and their interconnecting surfaces of different thickness or cross-section.

The filter base or engine attaching member 10 is shown in Figs. I and II as a single body made of suitable casting materials such as cast iron with its lower end forming an angularly disposed planar surface arranged to fit a machined pad provided on the side of the internal combustion engine (not shown), to which the filter is attached by means of bolts passing through openings 16 provided on the end flange 17. The body of the support 10 is pierced with a plurality of passageways 18, only one shown, forming inlet and outlet conduits adapted to be placed in communication with the lubricating system of the internal combustion engine into and from which the oil to be filtered passes.

The shell or the container part 12 may take the form of a hollow tubular member of light weight material or may be made of a suitable metal having a thin cross-section which, as shown in Figs. I and II, is preferably made from a length of standard steel thin-wall tubing or pipe. The container section 12 is provided with an internal ledge which may take the shape of an inwardly projecting shoulder or annular fold 20 located at a point spaced from its lower end bounding the connecting section 21 which embraces the top enlargement or flange 23 of the base member 10.

The flange 23 of the base 10 is located at the upper end of its upstanding section and has a vertical outer surface 24 bound by horizontal shoulders 25 and 26. The lower shoulder 25 is in contact with an inturned flange 27 formed by the end of the container part 12. The wall of the section 21 is permanently joined or anchored to the flange by being welded to a round headed metallic tie or by having spaced portions electrically welded to a plurality of inserts 28 having their shanks 29 pressed or driven into spaced openings 30 provided in the flange 23 and formed with a recess 31 for accommodating their heads 32 and some of the fused metal urged therein during the welding operation.

The upper shoulder or planar surface 26 of the base 10 abuts on the compressible heat-resistant sealing and gasketing means 35 which is clasped thereagainst by the ledge 20 of the container. The clasping action takes place by the application of pressure to force the base and shell together during the spaced or non-continuous welding of the section 21 to the metallic inserts 28 as will be described hereinafter. The heat generated during welding is utilized to provide a resultant force on the compressible gasket 35 which will not relax thereafter but which will insure enhanced tightness between the container and base sections.

The inserts 28 are made of materials or of a metal readily weldable with that of the end section 21 of the container part 12 and may take the form as shown of self-threading steel screws or drive pins provided with a round head or enlargement 32 terminating into a round projection to facilitate spot or non-continuous projection welding with the shell section 21. In order to expedite and effectively perform the welding of spaced portions of the shell section 21 with the metallic inserts 28, the flange is so dimensioned and formed to a configuration that its surface 24 fits with a very small clearance within the lower end section 21 with the ends of the heads or round projections 32 of the metallic inserts in tight engagement with the inner surface of said section.

The gasketing and sealing means 35 of the invention, which coacts to effectively produce the hermetically sealed joint between the shell 12 and the base 10, may take the form of a resilient or compressible sealing element of non-inflammable, heat or high temperature resistant material which possesses inherent flexibility to compensate for the different coefficients of expansion of the materials or metals from which the base and container sections are fabricated. In the form of the invention shown in Figs. I and II, the sealing means 35 is embodied as an asbestos or silicon gasket.

The composite filter housing illustrated in Figs. I and II embodying the fluid-tight seal of the invention for securing the container part 12 to the base 10 each formed of materials which have diverse adaptability to electric welding can be produced with a high degree of effectiveness by employing the process hereinafter outlined.

The method of producing the composite housing before described may be summarized as including as one of its steps the formation of an internal ledge at a point spaced from one end of the metallic container part 12 in order to bound or separate by an internal abutment its base receiving section 21 from the rest of the container part. This ledge may take any suitable form such as an inwardly projecting shoulder or the fold 20 which can be produced by suitable dies or other known mechanical expedients. Another step comprises forming one end section of the base 10 with an enlargement complementary to the container section 21 such as the flange 23. Another step comprises securing the metallic inserts 28, of a material weldable with the container part 12, to the flange 23 with their ends slightly projecting from its lateral surface 24. The shanks 29 of the headed inserts 28 are preferably embedded or pressed in openings 30 arranged at intervals on the outer surface 24, each opening being provided with a recess accommodating their heads 32, allowing the same to slightly project from the plane of said surface. Another step consists in seating on the ledge or fold 20 of the part 12, a compressible, temperature proof, resilient sealing element such as the asbestos or silicon gasket 35.

After the formation of the container and base members, before outlined, the same are assembled in telescopic relation with the gasket 35 located between the ledge 20 and top surface 26. The base and container parts may be held in such assembled relation by turning or rolling the end of the container part against the lower shoulder 25 forming the inturned flange 27. The formation of the flange 27 can be omitted as the same is used primarily to facilitate transport of the assembly to pressure-applying and electric bonding or welding apparatus.

In carrying out the process of the invention suitable conventional compression or squeezing apparatus may be used to apply forces in the direction of arrows A and B to drive together the base member and container part 12 for placing under relatively high linear compression the gasket or sealing means 35 by their juxtaposed surfaces. In addition, conventional electric bonding devices may be used to weld the container part 21 to the heads 32 of the inserts 28. Moreover, the pressure-applying and welding operations may be performed by a suitable pressure-applying and welding machine.

The pressure-applying and welding operations are performed in substantially concurrent relation to hot-fashion a portion of the container section 21 for forcibly clasping by its ledge 20 the gasket 35 against shoulder 26 of the base without relaxation. This clasping is obtained by applying axial or linear pressure to ledge 20 while the anchoring of section 21 by welding it to the inserts 28 takes place and by permitting the section to contract under pressure to thereby insure enhanced tightness.

The welding and pressure-applying operations comprise establishing and causing an electric current of proper value to flow through the base 10, inserts 28, and the container section 21 in order that the section 21 heats or approaches its plastic state. The welding of the section 21 to the inserts 28 is effected while application of linear pressure in the direction of arrows A and B takes place. The welding operation is preferably performed when the metal of the annular section of the container between the fold 20 and the plane of the inserts 28 is in a plastic state and while the parts are driven together to compress the sealing gasket 35 and maintained under linear compression after the current flow is interrupted.

The application of pressure while the section 21 is heated forces the lower surface of the inwardly projecting fold 20 closer to the planar surface 26 of the base member and serves to coin or conform the gasket to the contour of such surfaces, so that the contraction of the section under pressure, after the current is interrupted, enhances the fluid-tight joint between container and base member. It should be noted that the temperature of the top annular portion of the container section 21 is relatively high during the welding operation and that as the same cools under pressure, a linear contraction results which further tends to press the fold 20 against the gasget 35, placing under high linear tension the metal between the fold 20 and the weld to the inserts 28. In addition, the temperature of the composite housing under most severe service conditions is considerably lower than during the welding operation. Therefore, the linear tension of the metal is never relaxed by expansion. Hence, the joint between the container part 12 and member 10 remains fluid-tight at all operating temperatures.

The method of the invention, including the steps hereinbefore described, has enabled the applicants to utilize the most effective materials for the container part and base member, permitting combinations of dissimilar metals. Thus the base member 10 may be made of cast iron, cast aluminum, casting alloys, and from a combination of metallic materials, as well as fabricated from a body of steel, of ferrous, or non-ferrous materials, while the container part 12 may be made of the steel sheet or tubing, aluminum sheet or other non-ferrous tubing and from a combination of metallic materials, the selection of the materials for each part being dependent upon the specific use and conditions of service to which the composite housing may be subjected.

In the form shown in Fig. III, the invention is incorporated in an expendable composite filter comprising a container part 42 having a fluid-tight, temperature and vibration-proof connection with each of the end closing members 44 and 45. The housing is provided with inlet and outlet connectors 46 and 47 for connecting the filter to the lubricating system of an engine. The container part 42 is shown in the form of a hollow cylindrical member of light-weight material having a thin cross-section, preferably made from a length of standard steel thin-wall tubing. Internal abutments 48 and 49 are provided adjacent each end of the container and each has inwardly projecting, inclined, annular surfaces 50 and 51 respectively which bound or separate from the main body section and end-receiving sections 52 and 53 for the closing members 44 and 45.

The end closing member 44 may be made of any suitable material and is dimensioned so that its outer surface 54 fits the configuration of the receiving section 52 of the container part 42. The wall of the section 52 is permanently joined or anchored to the member 44 by having spaced sections 56 pressed and welded to a plurality of metallic ties or inserts 58 made of a metal readily weldable to said sections. The inserts 58 are shown as self-threading steel screws having their shanks 59 pressed or driven into spaced openings 60 formed on the surface 54 which are provided with a recess 61 to accommodate their heads 62 and the metal pressed therein during the welding operation. The upper surface of the closing member 44 is formed with an angularly disposed section 64 corresponding with the inclined surface 50 of the abutment 48 and is in direct engagement with the resilient, compressible, temperature-proof gasket 65 clasped between their juxtaposed surfaces 50 and 64 of the container and closing member respectively.

The end closing member 45 may be made of any suitable material and is dimensioned so that its outer surface 67 has a sliding fit within the container end section 53. The container part 42 is permanently anchored to member 45 by having spaced portions of the wall of its section 53 welded to a plurality of metallic inserts 68 made of a material readily weldable therewith. The inserts 68 may take the form of fluted drive pins or self-threading screws having their shanks 69 embedded or pressed into openings 70 which are formed with an annular frontal recess 71 to accommodate the enlarged portion or heads 72. A beveled surface or perimetrical chamfer 74 corresponding to the angularly disposed surface 51 of the internal abutment 49 is formed on the member 45. The perimetrical chamfer 74 abuts on the compressible, temperature-proof gasketing means 75 which is clasped and compressed thereagainst by the container surface 51. The upper surface 76 of the member 45 is engaged by an inturned flange 77 formed at the end of the container part 42.

The inserts 58 and 68 are made of materials readily weldable with that of the sections 52 and 53 of the container part 42 and each insert is provided with an enlargement terminating into a spherical or non-continuous rounded projection to facilitate a spot or projecting welding with the container part 42. The sealing elements 65 and 75, which coact to produce a hermetically sealed composite filter housing, are made of resilient or compressible, temperature-proof material possessing inherent flexibility to compensate for differences in the coefficient of expansion of the container part and end closing members and may take the form of an asbestos or silicon gasket.

The method of producing the expandable composite filter housing shown in Fig. III is similar to the method before described for manufacturing the composite filter housing illustrated in Figs. I and II. This method includes broadly the steps to effect the setting off the receiving sections 52 and 53, for the closing members 44 and 45, from the main body section of the container part 42. This setting off may be secured by forming concurrently the internal abutments 48 and 49 with the angularly disposed surfaces 50 and 51 by suitable dies or other mechanical expedients. Other steps include the formation of each of the end closing members to a configuration adapted to fit the corresponding receiving sections 52 and 53 of the container part and the provision of beveled surfaces or perimetrical chamfers 64 and 74 complementary to the angularly disposed surfaces 50 and 51. Another step comprises securing the metallic inserts 58 and 68 to the outer surfaces of each of the end closing members. The inserts for the end closing member 45 are arranged so that their ends slightly project from its lateral surface 67 while the ends 62 of the inserts 58 are in a plane inwardly offset from that of the surface 54.

After the formation of the container part 42 and end closing members 44 and 45 by the steps outlined, the same are assembled in telescopic relation with the gaskets 65 and 75 in contact with the angularly disposed surfaces 50 and 51 and chamfers 64 and 74 of the container part and end closing members respectively in order to effect a hermetic joint therebetween which will not relax after the welding and pressure applying operations.

The pressure applying and welding steps for anchoring each of the end closing members to the container part through the metal inserts are performed in substantially concurrent relation in order to hot-fashion a portion of the container section for clasping each one of the gasket members 65 and 75 respectively by the corresponding angularly disposed surfaces 50 and 51 without relaxation against the beveled surfaces 64 and 74 respectively. The spaced anchoring of the top end closing member 45 to the container section 53 through the inserts 68 is obtained by following the procedure outlined in connection with the anchoring of the base member to the container part shown in Figs. I and II. The non-continuous welding operation for this form of the invention is completed while axial pressure is applied to force the member 45 towards the inclined surface 51 of the container part to effectively compress the temperature proof gasket 75 by the juxtaposed mating surfaces 51 and 74 respectively.

The anchoring or non-continuous bonding of the end closing members 44 by its inserts 58 to spaced portions of the container part 52 includes not only application of axial or linear pressure, as indicated by arrows C and D, during the welding operation but the forcing of the metal of sections 56 of the container part into the recesses 61 in order to enhance the anchoring of the container part to the end closing member 44. As the container sections 56 approach their plastic state, radial pressure is exerted by the electrodes so that spaced sections 56 are depressed while being welded to the heads of the inserts 58 as shown in the drawing. The axial pressure, as well as the transverse or radial pressure exerted by the welding electrodes, is maintained during and after the welding current is interrupted, so that the cooling of the container section 52 takes place under pressure, thereby creating axial and radial forces for enhancing the fluid-tight joint between the container part and the end closing member 44.

The contraction which results during the cooling of the section 52 of the container part after the welding to the inserts 58 urges the angular surface 50 to forcibly press in linear and radial directions the gasket 65 against the chamfer 64 of the member 44. This resultant force places under high tension the metal located between the depressed sections 56 and the angular surface 50 of the container section 52. The tension of the metal adjacent the angular surface 50 is not relaxed after the axial pressure is discontinued or by expansion because the expendable filter housing operates at temperatures considerably lower than the temperature to which the metal is subjected during the welding operation.

In the form of the invention shown in Fig. IV a fluid-tight, temperature and vibration proof seal is provided between a pair of members joined in lap relation having different thicknesses or cross-sections. In this form, the members are composed of materials which have diverse adaptability to electric welding, and numeral 80 identifies a member made of any suitable material of comparatively large cross-section at its point of juncture with a sheet metal member 82 which has comparatively thin cross-section at such point. The hermetic seal is provided by interposing and clasping between the juxtaposed surfaces 83 and 84 of the members a resilient, temperature-resistant gasket 85 which is permanently held under compression without relaxation. The gasket 85 is located in a suitable recess 86 of member 80 and is provided with suitable openings, which accommodate the inserts 88 giving clearance to the projecting enlarged ends or heads 92.

The inserts 88 are made of a material which is readily weldable to the material of which member 82 is fabricated and may take the form of self-threading screws or drive pins which have their shanks 89 embedded or pressed in openings 90 formed in member 80.

The gasketing and sealing means 85, which coact to effectively produce the hermetic seal between the members 80 and 82 is in the form of a resilient or compressible sealing element of heat-resistant or non-inflammable material which inherently compensates for the different coefficients of expaansion of the materials or metals from which the members 80 and 82 are made. In practice, it has been found that the invention can be fulfilled when the sealing means 85 is made of asbestos or silicon gasketing material.

The asbestos or silicon gasket 85 is held under high compression without relaxation at the juncture of members 80 and 82 by the welding of member 82 to the heads 92 of the inserts 88 while pressure is applied urging the members together in the direction of arrows F and G, so that the gasketing means 85 is clasped against the juxtaposed surfaces 83 and 84. The heat generated during the welding of the member 82 to the inserts 88 is utilized to provide a resultant compression force for the resilient, temperature-proof gasket 85 which will not relax after its cooling but which, to the contrary, insures enhanced tightening between the members 80 and 82. The high compressing effect is secured by the welding and cooling under pressure as the welding operation is performed when the metal of the thin cross-section member 82 is heated to substantially its plastic state and a force, to bring the members together and compress the sealing gasket 85, is maintained while the welding takes place and after the welding current is interrupted. It can be seen, therefore, that in this form of the invention the increase of the temperature of one member, due to the localized heat of welding, acts as means to enhance the compression of the gasket due to the expansion of one member with respect to the other. Moreover, the contraction of the heated member as the same cools enhances or increases the applied force to compress the gasket, so that relaxation of the metal is avoided under the most severe service conditions.

It is to be understood that the above detailed description of the present invention is intended to disclose an embodiment thereof to those skilled in the art, but that the invention is not to be constructed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A composite filter housing for cantilever mounting on the side of an internal combustion engine comprising a hollow container body of thin cross-section and a cast iron engine attaching supporting member therefor, said container body and member formed of metals lacking welding affinity, a flange formed at one end of the supporting member fitting within the container body for closing one of its ends, an engine attaching section formed at the other end of the member, said member provided with conduits into and from which liquid to be filtered passes, an inwardly-projecting ledge formed on the container body adjacent one end thereof for locating longitudinally the flange of the supporting member therein, a temperature resistant sealing gasket interposed between said ledge and the upper surface of said flange, metallic inserts of a metal readily weldable with the metal of the container body carried in spaced relation on the cast iron member by having one of their ends fixedly secured on the outer surface of the flange and their other ends welded to the inner surface of the container body for permanently securing the container body to the supporting member holding under compression said gasket without relaxation to provide a temperature and vibration resistant leak proof joint between the container body and its supporting member, and a cover for the other end of said container.

2. A composite filter housing for cantilever mounting on the side of an engine comprising component members formed of two different types of metals which are not weldable to each other including an attaching base member having upper and lower shoulders bounding a flange and formed of one type of said metals, a shell having a thinner wall cross-section than the member formed of the other type of said metals within which the flange of the member is held closing one end of the shell, an internal ledge formed on said shell, a heat resistant gasket interposed between said ledge and the upper shoulder of said flange, spaced metallic inserts formed of a type of metal of the shell being fixedly secured to the periphery of the flange, said metallic inserts and the inner surface of said shell being bonded together, for compressing said gasket to provide a leak-proof joint, an integral holding section of the shell embracing the lower shoulder of the flange, and a cover for closing the other end of said shell.

3. A composite filter housing comprising a hollow container body of thin cross-section and a member of thicker cross-section having a lateral surface portion fitting within the container body for closing one of its ends, said container and said member formed of metals lacking in welding affinity, an internal ledge formed on the container body adjacent one end thereof for locating longitudinally the said portion of the base member therein, a non-inflammable gasket interposed between said ledge and the upper surface of said surface portion, metallic inserts having welding affinity to the container body fixedly secured in spaced relation on the outer surface of said surface portion and welded to the inner surface of said container body for permanently securing the container body to the member holding said gasket under compression, and a cover for closing the other end of said container body.

4. A composite filter housing for cantilever mounting on the side of an internal combustion engine comprising a container part formed of a length of steel tubing of thin cross-section and an engine attaching supporting member therefor formed of cast iron, a flange formed at one end of the supporting member fitting within the length of tubing for closing one of its ends, an engine attaching section formed at the other end of the member, said member having passages into and from which liquid to be filtered passes, an internal ledge located adjacent one end of the length of tubing for locating longitudinally said flange therein, a temperature resistant gasket interposed between said ledge and the upper surface of said flange, spaced steel inserts fixed to the outer surface of said flange and welded to the inner surface of the length of said tubing for permanently securing the tubing to the supporting member and retaining under compression said gasket to provide a hermetic seal between said container part and said engine attaching member.

5. A composite housing comprising a container part provided with a metallic end section of thin cross-section bound by an internal shoulder, a member fabricated of a material lacking in welding affinity to the metallic end section of said container part and being dimensioned to fit with slight clearance said end section, a resilient non-inflammable gasket seated between the member and said shoulder, and an integral portion of said container part fashioned to forcibly clasp the gasket and being anchored through spaced inserts carried by the member which project into engagement with the inner surface of the container part and are welded thereto.

6. A composite leak-proof structure comprising a metallic member having an end portion of thin cross-section, a second member formed of a material which has diverse adaptability to electric welding with the thin cross-section portion of the first member and having a comparatively thick section dimensioned and of a contour fitting the thin portion of the first member, a resilient sealing element seated on a recess formed on the second member and projecting therefrom, spaced metallic inserts having one of their ends fixed to the second member and their other ends welded to the inner surface of the thin cross-section portion of the first member, the thin cross-section of the first mentioned member caused to be heated during the welding of the metallic insert to be hot fashioned to forcibly compress the sealing element so as to contract during cooling to permanently maintain a sealed joint between the members insuring enhanced tightness after cooling.

7. A composite filter housing comprising a hollow thin metallic casing and a member permanently held in place therein by an inwardly projecting shoulder formed on the inner surface of the casing at a point spaced from its end and an inturned integral holding flange located at the end of the casing in direct engagement with the member, a non-inflammable resilient and compressible sealing gasket interposed between the end surface of the member and the inwardly projecting shoulder of the casing, a plurality of metallic inserts embedded at spaced intervals on the outer surface of the member, said inserts welded to the inner surface of the casing end portion thus heated during the welding to a substantially plastic state, and the portion of the casing between the shoulder and the weld with the inserts forcibly clasping a portion of the member and sealing gasket so that during normal cooling the said end portion of the casing contracts to place under high tension the metal of said portion to insure enhanced tightness between the casing and member.

8. The method of forming a container by joining a thin metallic shell member to a base member each made of metals lacking in welding affinity which comprises of forming a flange on the base member dimensioned to project within one end of the shell member, of securing in spaced relation metallic inserts on the outer lateral surface of the flange said inserts made of a metal weldable with that of the shell member, of forming an internal ledge at a point spaced from one end of the shell, of assembling the shell and base member in telescopic relation placing between the ledge and the flange a high temperature resistant gasket, of joining the shell to the base member by welding electrically the shell to said inserts thus heating the shell to relatively high temperature, of applying pressure to force the members together during welding, of maintaining said pressure during cooling causing the sealing gasket to be compressed and to thereby permanently maintained the compression thereof by the contraction of the shell member after its cooling.

9. The method of forming a housing by permanently holding within one end of a hollow thin metallic casing a member made of a material which has diverse adaptability to electric welding with the casing which comprises in forming the member dimensioned to project within one end of the casing, of securing inserts weldable with the casing at spaced intervals on the outer lateral surface of the member, of forming an internal ledge at a point spaced from one end of the casing, of seating on the ledge a compressible high temperature resistant sealing element, of placing the member within the casing contacting the sealing element, of joining the causing to the member through said inserts by heating the end of the casing to fusion temperature while applying pressure to force the casing and member together compressing the sealing element, and allowing the casing to contract under the applied pressure to thereby insure enhanced tightness between the casing and member.

10. The method of forming a housing by permanently holding within one end of a hollow metallic casing a member made of a material which has diverse adaptability to electric welding with the casing which comprises in forming the member dimensioned to project within one end of the casing, of securing inserts weldable with the casing at spaced intervals on the outer lateral surface of the member, of forming an inwardly projecting angularly disposed surface at a point spaced from one end of the casing, of seating on the projecting surface a compressible temperature-proof sealing gasket, of placing the member within the casing contacting the sealing gasket, of joining the casing to the member through said inserts by heating the end of the casing to fusion temperature while applying pressure to force the casing and member together compressing the sealing gasket and of maintaining the applied pressure during cooling to thereby insure enhanced tightness between the casing and member.

11. A composite leak-proof housing comprising a hollow metallic shell provided with a relatively thin end section bound by an internal shoulder, a member of thicker cross-section than said shell having a section dimensioned to snugly telescope within the thin end section of the shell with a peripheral surface abutting said shoulder, said shell and member formed of materials which have diverse adaptability to electric welding and different coefficients of expansion, a non-inflammable resilient sealing gasket located between said shoulder and the peripheral surface of the telescoping section of said member, and a plurality of spaced metallic inserts having welding affinity to the shell located on the lateral outer wall of the telescoping section of said member slightly projecting therefrom and welded to spaced portions of the inner surface of the shell to permanently hold by noncontinuous welding under high linear compression the non-inflammable gasket and thereby produce a leak-proof joint between said shell and member.

12. The method of forming a leak-proof container by joining a thin metallic shell member to a base member each made of materials which have different coefficients of expansion which comprise forming a flange on the base member dimensioned to snugly telescope within one end of the shell member; securing in spaced relation on the outer lateral surface of the flange a plurality of inserts made of a metal weldable with that of the shell; forming an internal ledge at a point spaced from one end of the shell; assembling the shell and base in telescopic relation while placing between the ledge and flange a high temperature resistant sealing gasket; applying linear pressure to force the shell and base member together placing the gasket located therebetween under predetermined linear compression; welding electrically spaced sections of the shell to each of the inserts without stopping the application of linear pressure until the welding step is fully carried out for permanently maintaining by non-continuous welding under such predetermined linear compression the sealing gasket and thereby forming a leak-proof joint between the shell and base.

13. The method of forming a leak-proof container by joining a hollow metal member to an inner base each made of materials which have different coefficients of expansion comprising forming adjacent to one end of the base a flanged portion dimensioned to project within the member; forming a perimetrical chamfer on the top surface of the flanged portion of the base; securing metallic inserts at spaced intervals on the outer surface of the flanged portion of the base; forming an internal ledge spaced from one end of the member of similar contour to the chamfer on the base; assembling the member and base in telescopic relation locating between their ledge and chamfer a non-inflammable sealing gasket; applying linear and radial pressure to force the base and member together for subjecting under predetermined linear and radial compression the non-inflammable sealing gasket located therebetween; and electrically welding spaced sections of the shell to each of the inserts without stopping the application of linear and radial pressure during the welding operation for permanently holding by noncontinuous welding under substantially such predetermined compression the non-inflammable sealing gasket to provide a leak-proof joint between the member and base.

14. The method of forming a leak-proof container by joining a tubular sheet metal member to end closing members formed of materials of different coefficients of expansion for producing a hermetic seal therebetween which comprises forming the end closing members dimensioned to project within the ends of the tubular member; forming a perimetrical chamfer on the outer surface of each end closing member; securing metallic inserts arranged at spaced intervals to the outer surface of each of the end closing members; forming at a point spaced from each end of the tubular member an internal ledge having a surface of similar contour to the perimetrical chamfer of the members; assembling the end closing members at each end of the tubular member in telescopic relation while placing between each ledge and the perimetrical chamfer of each of the end closing members a resilient non-inflammable sealing gasket; applying linear pressure to drive the end closing members within each end of the tubular member for subjecting each resilient sealing gasket under predetermined linear compression; and electrically welding spaced sections of the tubular member to the inserts without stopping the application of linear pressure until the welding operation is completed for permanently retaining by non-continuous welding under substantially such predetermined compression the non-inflammable sealing gaskets to provide a leak-proof joint at each end of the tubular member with the respective end closing members.

References Cited in the file of this patent

UNITED STATES PATENTS

| Number | Name | Date |
|---|---|---|
| 414,686 | Dinn | Nov. 12, 1889 |
| 508,351 | Shipe | Nov. 7, 1893 |
| 984,719 | Thomson | Feb. 21, 1911 |
| 1,022,712 | Thomson | Apr. 9, 1912 |
| 1,314,352 | Morin | Aug. 26, 1919 |
| 1,326,692 | Rogatchoff | Dec. 30, 1919 |
| 1,665,608 | Schneider et al. | Apr. 10, 1928 |
| 1,748,576 | Merriam | Feb. 25, 1930 |
| 1,931,679 | Price | Oct. 24, 1933 |
| 1,947,462 | Doorbar | Feb. 20, 1934 |
| 2,110,124 | Fitzgerald | Mar. 8, 1938 |
| 2,263,021 | Uecker | Nov. 18, 1941 |
| 2,352,754 | Anderson et al. | July 4, 1944 |
| 2,522,565 | Burhans | Sept. 19, 1950 |